(12) United States Patent
Binet et al.

(10) Patent No.: US 8,098,619 B2
(45) Date of Patent: Jan. 17, 2012

(54) METHOD FOR ALLOCATING A TEMPORARY ADDRESS TO A MOBILE NODE OF A TELECOMMUNICATION SYSTEM, EQUIPMENT AND PROGRAMS FOR IMPLEMENTING SAME

(75) Inventors: David Binet, Blainville sur Orne (FR); Frédéric Klamm, Luc sur Mer (FR); Brahim Gaabab, Toulouse (FR)

(73) Assignee: France Telecom, Paris (FR)

( * ) Notice: Subject to any disclaimer, the term of this patent is extended or adjusted under 35 U.S.C. 154(b) by 1028 days.

(21) Appl. No.: 11/989,469

(22) PCT Filed: Jul. 20, 2006

(86) PCT No.: PCT/FR2006/001783
§ 371 (c)(1),
(2), (4) Date: Jan. 25, 2008

(87) PCT Pub. No.: WO2007/012732
PCT Pub. Date: Feb. 1, 2007

(65) Prior Publication Data
US 2009/0034494 A1      Feb. 5, 2009

(30) Foreign Application Priority Data
Jul. 28, 2005   (FR) ..................................... 05 08078

(51) Int. Cl.
*H04Q 7/00*       (2006.01)
*H04W 4/00*      (2009.01)
(52) U.S. Cl. ..................................... 370/328; 455/435.2
(58) Field of Classification Search .................. None
See application file for complete search history.

(56) References Cited

U.S. PATENT DOCUMENTS

| 7,349,364 | B2 * | 3/2008 | Omae et al. | 370/328 |
|---|---|---|---|---|
| 7,369,522 | B1 * | 5/2008 | Soininen et al. | 370/328 |
| 7,489,667 | B2 * | 2/2009 | Faccin et al. | 370/338 |
| 7,545,768 | B2 * | 6/2009 | Haverinen et al. | 370/328 |
| 2003/0043773 | A1 * | 3/2003 | Chang | 370/338 |
| 2004/0018841 | A1 * | 1/2004 | Trossen | 455/436 |

(Continued)

FOREIGN PATENT DOCUMENTS
EP      1 496 653 A      1/2005

OTHER PUBLICATIONS

Park M. Lee "Link Characteristics Information for Mobile IP" Samsung Electronics, Univerisity of York S., IETF Standard-Working-Draft, Internet Engineering Task Force, IETF, Ch, No. 2 Jun. 8, 2005, (XP015041641).

(Continued)

*Primary Examiner* — Hassan Phillips
*Assistant Examiner* — Eunsook Choi
(74) *Attorney, Agent, or Firm* — McKenna Long & Aldridge LLP

(57) ABSTRACT

The invention concerns a method wherein the mobile node (1) obtains respective temporary addresses with several access routers (3) of a telecommunication system detected by the mobile mode. It also collects data concerning the characteristics of said access routers, and transmits to a manager temporary addresses (6) of a mobility service provider a request for address selection (REQ) containing part at least of the collected data. The manager (6) processes said request to select one of the temporary addresses for the mobile node.

6 Claims, 2 Drawing Sheets

U.S. PATENT DOCUMENTS

| | | | |
|---|---|---|---|
| 2004/0142657 A1* | 7/2004 | Maeda | 455/11.1 |
| 2005/0078635 A1* | 4/2005 | Choi et al. | 370/331 |
| 2005/0185653 A1* | 8/2005 | Ono et al. | 370/395.21 |
| 2006/0018273 A1* | 1/2006 | Yamada et al. | 370/328 |
| 2006/0039335 A1* | 2/2006 | Ono et al. | 370/338 |
| 2009/0303962 A1* | 12/2009 | Jokikyyny et al. | 370/331 |

OTHER PUBLICATIONS

Johnson et al., "Mobility Support in IPv6", IETF, RFC3775, Jun. 2004, pp. 1-136.

Devarapalli, et al., "Network Mobility (NEMO) Basic Support Protocol", IETF, RFC3963, Jan. 2005, pp. 1-28.

* cited by examiner

METHOD FOR ALLOCATING A TEMPORARY ADDRESS TO A MOBILE NODE OF A TELECOMMUNICATION SYSTEM, EQUIPMENT AND PROGRAMS FOR IMPLEMENTING SAME

This application claims the benefit of PCT Patent Application No. PCT/FR2006/001783, filed Jul. 20, 2006, which claims the benefit of French Patent Application No. 05 08078, filed Jul. 28, 2005, which are both hereby incorporated by reference in their entirety.

FIELD OF THE DISCLOSURE

The present invention relates to mobile communication nodes, particularly those that use the IP ("Internet Protocol") protocol.

BACKGROUND

It applies to both roaming terminals and roaming networks. The IP mobility of a terminal is usually managed in the terminal itself, whereas the mobility of a network is managed by a specific item of network equipment called a mobile router. In the present application, the term "node" indicates either a mobile router or a roaming terminal.

"Home network" means the IP network to which the mobile network or terminal is attached when it is not roaming. "Visited network" means the IP network to which the terminal or network is connected when it is in a mobile situation.

"Home agent" means the entity of the home network with which a roaming node registers its temporary address. It is responsible for forwarding the data streams to roaming nodes.

The mobile node has a reference address configured with the prefix of its home network. If it is a router, this reference address may also be configured based on a prefix allocated to the mobile network (mnp). This address, called the "home address", is here marked HoA. It may furthermore configure one or more temporary addresses using a prefix of a visited network. Such a temporary address or "care-of address" is here marked CoA.

A node in a mobile situation or roaming usually uses protocols specified by the IETF ("Internet Engineering Task Force") for communicating by using one of its CoAs, particularly the mobile IP (see "Mobility Support in IPv6", IETF, RFC 3775, June 2004) and Nemo-BS (see "Network Mobility (NEMO) Basic Support Protocol", IETF, RFC 3963, January 2005) protocols. Communicating means clearly a two-way communication. This mobile node is then attached to a visited network.

Management of IP mobility of the nodes is based on the temporary allocation of an IP address to the node when the latter is in a visited network. This address is communicated to the home agent which is responsible for forwarding to the temporary address the data streams intended for the roaming node. This means that the home agent must know the "position" (the temporary address) of the node every time the latter changes its network of attachment. The roaming node must therefore inform its home agent of its new temporary address when it perceives a change of network.

The Mobile IP and Nemo-BS protocols are based on an anchoring principle by which the home agent of the mobile node is responsible for relaying the traffic to it when this node is attached to visited networks. The mobile node has a registration associating its temporary address (CoA) with its home address (HoA). In order to keep the association up to date during a change of network, a three-step transfer procedure, or "handover", has been defined:

1. Detection of the movement: the mobile node ascertains that it has changed network of attachment while roaming;
2. Address configuration: the mobile node configures a temporary address (CoA);
3. Association update: the mobile node informs the home agent of its new location (CoA).

During its roaming, it is possible for a mobile terminal to configure several temporary addresses corresponding to one or more access routers. However, Mobile IP provides for only one association (HoA, CoA) to be active (registered) at a given moment. Therefore, before sending an association update message (step 3), the mobile node has already chosen its CoA. The home agent can only acknowledge and relay the traffic in the event of success.

Selecting a CoA in itself is not governed by a real rule. The choice of one or other of the temporary addresses is left to the mobile node which changes the association only after having verified that the preceding association is no longer usable, usually in the case in which the corresponding access router can no longer be reached.

For mobile networks, mobility management according to Nemo-BS provides no details relating to the selection of a CoA. However, it involves routers for which the choice may have a strong influence on the conditions of use in the mobile network.

The CoA selection procedure is not carried out only at the time of a handover. A mobile node that starts up carries out the three steps described above and may be required to make a choice of CoA.

A mobile node may today know certain characteristics of the attachments that can be used. Various tasks are being conducted for the detection of new access networks, the determination of an identity for each link found and of the prefix or prefixes that it uses, and the detection of the capabilities of the routers (compression, access control, etc.).

The document Park, et al., "Link Characteristics Information for Mobile IP" published by the IETF as an Internet Draft in June 2005 (draft-daniel-mip-link-characteristic-02.txt) describes the uploading by the mobile node of certain information relating to the attachments. It defines a mobility option for uploading to a correspondent or the home agent the attachment characteristics of a given type (IEEE 802.11a, IEEE 802.11b, cellular, etc.). This allows the correspondent or the home agent to adapt its behavior to suit the attachment characteristics that have been indicated to it so that, for example, it does not continue to send high speed data to a mobile node that may have switched to a low speed link, which would cause traffic congestion. This process is independent of the selection of the CoAs.

As defined today, IP mobility management provides only an incomplete solution for reducing the multiple address configuration alternatives. In particular, the registration of associations has limitations because a new CoA is registered only when the old one can no longer be used, that is to say when the corresponding access router can no longer be reached.

The possibility offered to the mobile nodes to configure several temporary addresses originating from several attachments (various access routers belonging if necessary to visited fixed or mobile networks) means that the mobile nodes may have a choice of access types with potentially very non-uniform intrinsic characteristics. These accesses may differ according to several criteria: nominal quality of service, load conditions, functionalities supported, provider, etc. For reasons of service, reliability or strategy, it is advisable for the mobile node to prefer one or other of these accesses according to specific criteria. A policy of choice must therefore be put in place.

SUMMARY

According to the model of the Mobile IP and Nemo-BS protocols, it is the mobile node that is responsible for choosing its CoA temporary address from the alternatives offered to it. A mobile node may therefore satisfy its own requirements, but it cannot satisfy the requirements of the access networks, usually based on traffic engineering rules concerning several other mobile nodes and on economic and technical constraints. The traffic engineering information is usually unknown to the mobile nodes and taking it into account would require additional processing capabilities. Temporary address selection by the mobile node is therefore an unsatisfactory solution.

One object of the present invention is to provide an alternative solution that has greater flexibility for the management of the access networks, by substituting for the temporary address selection random process a deterministic mechanism allowing for example a mobility service provider to choose the address and therefore the interface most appropriate to meet the service requirements of this provider. Another object is for the solution to apply to nodes that discover new IP networks as they roam, but also to mobile nodes which, on startup, configure and register a CoA.

The invention therefore proposes a method for allocating a temporary address to a mobile node of a telecommunications system, said temporary address being registered in association with a permanent address of the mobile node with a home agent (5) responsible for forwarding the data streams to the roaming mobile node, comprising the following steps:
  obtaining respective temporary addresses of the mobile node for several of the system's access routers detected by the mobile node;
  collecting at the mobile node information relating to characteristics of said access routers;
  transmitting, from the mobile node to a temporary address management module of a mobility service provider, an address selection request containing at least a portion of said collected information; and
  processing the address selection request at the management module in order to select one of the temporary addresses for the mobile node,
  returning to the mobile node (1) a message (REP) indicating at least one address prefix identifying the selected temporary address,
  on receipt of the message, configuring the mobile node so that it communicates through the system by means of the access router corresponding to said prefix,
  updating the association between the selected temporary address and the permanent address of the mobile node with the home agent of the mobile node.

The temporary address is chosen from several possible addresses according to parameters transmitted by the mobile node. The process of uploading information to a central item of equipment, for example collocated with the home agent, makes it possible to define a temporary address selection algorithm in order, for example, to be able to optimize the traffic engineering and propose a service verifying the qualities of service criteria granted to the mobile nodes.

Thanks to the centralization of the entity responsible for the choice of the address, it is possible to satisfy the multiple needs of choosing a temporary address without being penalized by the fact that the mobile nodes have only one vision of the network limited to solely the information on the CoAs that they can configure and the corresponding accesses. This centralization is also advantageous for questions of economy, particularly in terms of complexity of the mobile nodes.

The temporary address management module may return to the mobile node a message indicating the selected CoA, and the latter may continue the procedure in a conventional manner by signaling this address to its home agent. Another possibility is that the temporary address management module signals the selected CoA directly to the home agent which advises the mobile node thereof.

The invention also proposes equipment and programs for the application of the above method. Therefore, another aspect of the present invention relates to a mobile communication node, comprising means for obtaining respective temporary addresses for several telecommunications system access routers detected by the mobile node, means for collecting information relating to characteristics of said access routers, means for transmitting, to a temporary address management module of a mobility service provider, an address selection request containing at least a portion of said collected information, means for receiving a message indicating at least one address prefix identifying the selected temporary address and configuration means for configuring the mobile node so that it communicates through the system by means of the access router corresponding to said prefix.

A computer program according to the invention to be executed by a processing unit of such a mobile communication node comprises instructions for executing the following steps during an execution by the processing unit:
  obtaining respective temporary addresses for several telecommunications system access routers detected by the mobile node;
  collecting information relating to the characteristics of said access routers;
  transmitting, to a temporary address management module of a mobility service provider, an address selection request containing at least a portion of said collected information; and
  receiving a message indicating at least one address prefix identifying the selected temporary address;
  configuring the mobile node so that it communicates through the system by means of the access router corresponding to said prefix.

Another aspect of the present invention relates to a temporary address management module for a mobility service provider in a telecommunications system, comprising means for receiving from a mobile node an address selection request containing information collected by the mobile node relating to characteristics of respective access routers from which the mobile node has obtained temporary addresses, means for processing the address selection request in order to select one of the temporary addresses for the mobile node, and means for signaling the selected temporary address comprising means for returning to the mobile node a message indicating at least the prefix of the selected temporary address. Such a temporary address management module will consist typically of a program executed on a computer of the mobility service provider that can be the same computer as that hosting the home agent for the mobile node.

Yet another aspect of the present invention relates to a signal transmitted from a mobile communication node to a temporary address management module of a mobility service provider in a telecommunications system. This signal transports an address selection request containing information collected by the mobile node relating to characteristics of several access routers detected by the mobile node, for which the mobile node has obtained respective temporary addresses.

BRIEF DESCRIPTION OF THE DRAWINGS

Other particular features and advantages of the present invention will appear in the following description of nonlimiting exemplary embodiments, with reference to the appended drawings, in which.

MORE DETAILED DESCRIPTION

Figure 1:
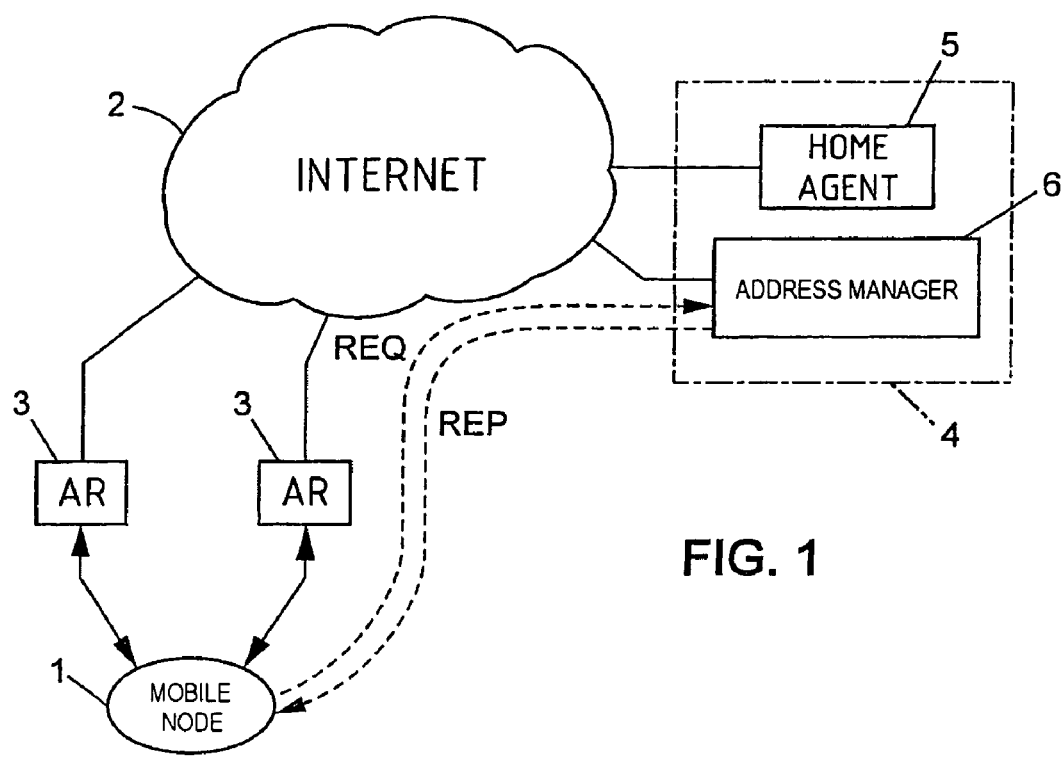
FIG. 1 is a diagram of a telecommunications system suitable for the application of a method according to the invention.

The mobile node 1 shown in FIG. 1 may consist in a mobile terminal or a mobile router. In the example shown, it may be connected to the Internet 2 by means of two access routers (AR) 3 belonging to the respective installations of two internet access providers. It will be understood that the method described here is applicable to the case in which the mobile node 1 has detected more than two access routers, and also to the case in which a given access router 3 is capable of supplying accesses of several different types.

The mobile node 1 receives services from a mobility provider whose installations 4 connected to the Internet 2 include servers hosting a home agent application module 5 and a temporary address management application module 6. In the example shown, the modules 5 and 6 are collocated, which forms the simplest architecture. The temporary address management function may furthermore be carried out by enhancing the functionalities offered by the home agent 5. In another possible architecture, the agent 5 and the module 6 are on separate host machines.

Figure 2:
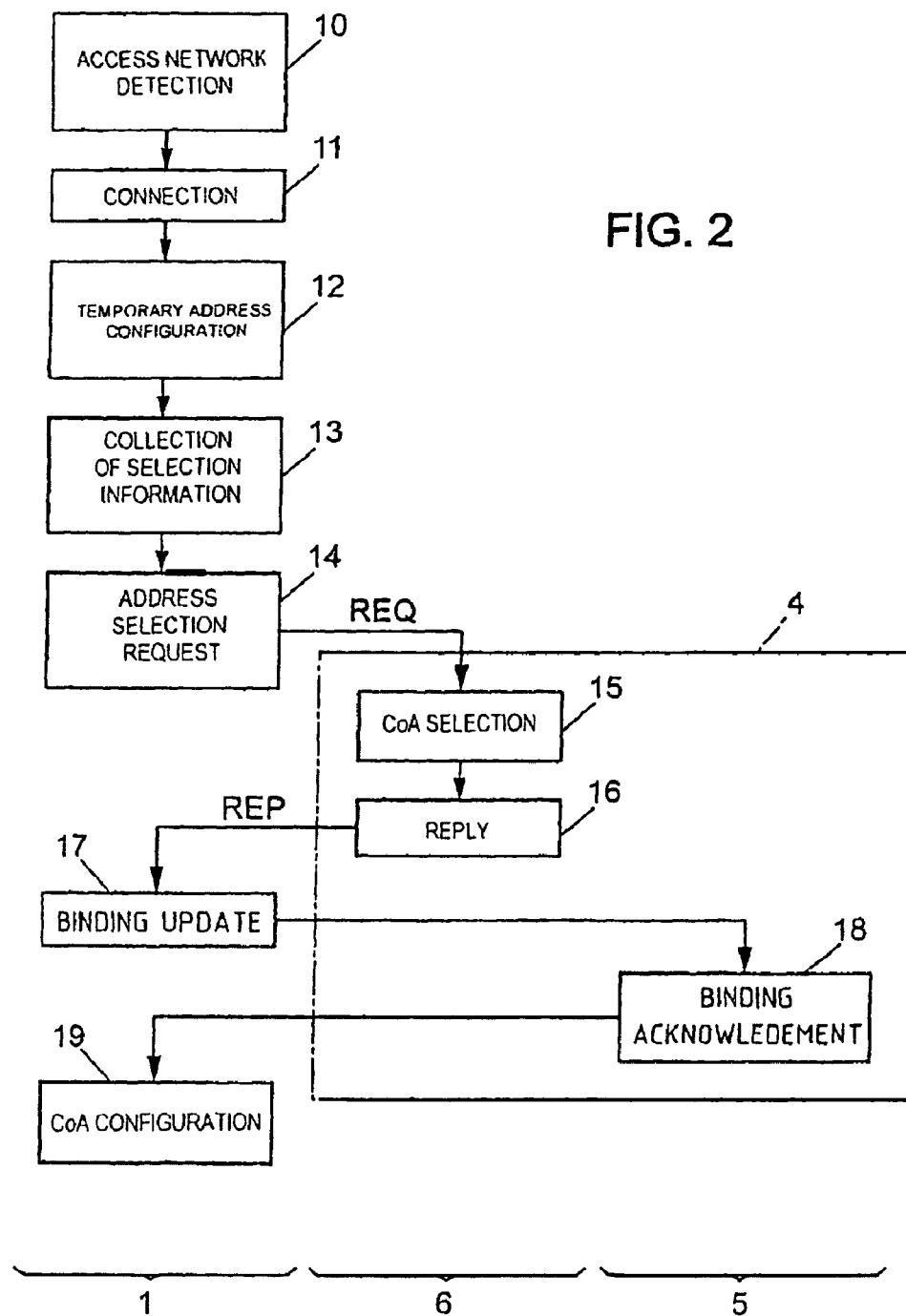
FIG. 2 is a flow chart of one embodiment of the method according to the invention.

For access to the Internet, the mobile node 1 comprises programs executed by a processing unit (CPU) which in particular use the procedures of layers 1 to 3 of the OSI (Open System Interface) model. The processes carried out on the mobile node 1 and corresponding to the selection of a temporary address (CoA) are illustrated by the left portion of FIG. 2.

The first steps 10, 11 are the processing of layers 1 and 2 carried out by the mobile node 1 to detect one or more access networks and to connect thereto. These processes depend on the access technologies available in the node 1 and the routers 3, and are well known to those skilled in the art. Then, the node 1 in a mobility situation configures one or more temporary addresses that it can use to communicate via the routers 3 (step 12). From there onwards, the method according to the invention differs from the technique usually employed. Rather than itself selecting a CoA from the configured temporary addresses, the mobile node 1 program begins by collecting selection information from the access routers 3 to which it is connected.

This collection 13 may be carried out by means of existing protocols, with or without the addition of specific options, or by defining a specific protocol. One possibility is to be based on the protocols currently being studied by the DNA ("Detecting Network Attachment") task force of the IETF, for example by using the presentation methods of routers called "Fast Router Advertisement" and "RA Caching". These methods determine an identity for each link discovered and the prefix(es) that can be used on this link for the IPv6 addresses. They rely on the interchange of RS/RA ("Router Solicitation/Router Advertisement") messages that form part of the NDP ("Neighbor Discovery Protocol") protocol. In the case of a handover, it is also possible to use the CARD (Candidate Access Router Discovery") protocol produced by the IETF Seamoby task force. CARD is an extendable protocol for detection of the capabilities of the routers, for example in terms of data compression, access control, etc., and of identification information such as the prefix or IP address of the router.

Some of the parameters collected in step 13 may be post-processed locally by the mobile node 1, but this is not essential. The mobile node 1 may add thereto parameters that are specific to it, particularly parameters relating to characteristics of its interfaces that interact with the access routers 3. The mobile node 1 has the information provided by the access routers 3 and local information, for example on the dynamic characteristics of its interfaces. All this information is aggregated, with any redundancies deleted, then if necessary preformatted according to the protocol employed for the transfer to the management module 6, to be included in the request REQ sent in step 14. This formatting may be of the same kind as that used in the "Binding Update" messages of the "Mobile IPv6" protocol, and the reply REP that the module 6 will return may symmetrically be formatted like the "Binding Acknowledgement" messages.

All the pertinent parameters to be included in the request REQ selection information may depend on the needs of the mobile node 1 and/or on the policy of the mobility service provider. The information collected in step 13 from the access routers 3 may in particular comprise:

a set of usable address prefixes, with their respective packet size and lifetime attributes;
an available quality of service (QoS);
a lifetime for the availability of the link;
an identity of the access provider controlling the router 3, etc.

They may be supplemented by one or more of the following parameters, specific to the mobile node 1:

a required QoS;
a nominal and/or peak bandwidth required;
a typical packet size;
for each access interface of the node:
    the type of interface;
    its state (active or inactive);
    the bandwidth available;
    the identification of the access router(s) to which it may be connected etc.

The request REQ is sent in step 14 using a temporary address that has been configured in step 12. On receipt of this request, the module 6 processes it in order to select the CoA for the mobile node 1 in step 15, then signals the selected CoA in step 16. In the example in question, the signaling consists in sending to the node 1 a reply message that contains the selected CoA, or a prefix of the latter. The node 1 then launches the updating of association with its home agent 5 by sending it a "Binding Update" message in step 17. The home agent 5 registers the new CoA and acknowledges receipt of it to the node 1 in step 18 with a "Binding Acknowledgement" message. The node 1 then terminates the procedure by configuring, in step 19, the CoA that has been indicated to it. It then communicates through the system by means of the access router corresponding to the CoA or to the prefix that has been indicated to it.

The address selection 15 may be carried out according to various algorithms, taking account of a greater or lesser wealth of parameters. One possibility amongst others is described below.

In this example, the manager 6 examines successively the interfaces of the node 1 that are in the active state, by allocating to them an interface selection index (ISI). This ISI index results from a comparison between the available bandwidth and that (those) required by the mobile node 1 (or by the entire network in the case of a mobile router). If the available bandwidth is acceptable according to the ISI index, the manager 6 considers successively the access routers to which the interface is connected, by allocating them the router selection index ISR whose value is initialized with that of the corresponding ISI index. The access provider is identified and an access provider database is interrogated to collect tariff information used to weight the ISR index. The ISR index may then be weighted according to the lifetime indicated for the availability of the link provided, and according to a comparison between the available QoS and that required by the node. If the ISR index is acceptable, the manager 6 considers successively the prefix values available for this router, by allocating them a prefix selection index ISP whose value is initialized with that of the corresponding ISR index. To re-evaluate the ISP index, the manager 6 takes account of the lifetime allocated to the prefix and of its packet size, compared with the typical size desired for the mobile node 1. After thus having looked over all the interfaces, all the available access routers and all the corresponding prefix values, the manager 6 constructs a list of prefixes that is ordered according to the ISR indexes, the optimal index prefix appearing at the head of the list.

This list of prefixes is transmitted to the mobile node 1 in the reply message REP, which indicates to the node 1 which of the temporary addresses has been selected as the CoA. The mobile node 1 then signals the selected CoA, having the prefix at the head of the list, to its home agent 5. If this address becomes unavailable, it may take the next address in the list (if there is one) or repeat the selection procedure from step 13 of FIG. 2.

In another possible embodiment, the management module 6 directly indicates to the home agent 5 the address that has been selected and the mobile node 1 is notified thereof. The temporary addresses obtained must then all be contained in the request REQ transmitted by the mobile node 1.

The method may have many variants relating to the particular embodiment that has been described. In particular it is not dependent on the details of the protocols that the nodes use to communicate. It can be transposed without difficulty to version 4 of the IP protocol.

The invention claimed is:

1. A method for allocating a temporary address to a mobile node of a telecommunications system, said temporary address being registered, in association with a permanent address of the mobile node, with a home agent responsible for forwarding a data stream to the roaming mobile node, the method comprising:
   obtaining, at the mobile node, respective temporary addresses of the mobile node for several of the system's access routers detected by the mobile node;
   collecting, at the mobile node, information relating to characteristics of said access routers;
   transmitting, from the mobile node to a temporary address management module of a mobility service provider, an address selection request comprising at least a portion of said collected information;
   processing the address selection request at the management module in order to select one of the temporary addresses for the mobile node;
   returning to the mobile node a message indicating at least one address prefix identifying the selected temporary address;
   on receipt of the message at the mobile node, configuring the mobile node so that it communicates through the system by means of the access router corresponding to said prefix; and
   updating the association between the selected temporary address and the permanent address of the mobile node with the home agent of the mobile node,
   wherein the address selection request further comprises a plurality of parameters relating to characteristics of interfaces of the mobile node interacting with the access routers for which the temporary addresses have been obtained.

2. The method as claimed in claim 1, wherein the message returned by the temporary address management module comprises an ordered list of address prefixes.

3. A communication mobile node, comprising:
   means for obtaining respective temporary addresses for several telecommunications system access routers detected by the mobile node;
   means for collecting information relating to characteristics of said access routers;
   means for transmitting, to a temporary address management module of a mobility service provider, an address selection request comprising at least a portion of said collected information;
   means for receiving a message indicating at least one address prefix identifying the selected temporary address; and
   configuration means for configuring the mobile node so that it communicates through the system by means of the access router corresponding to said prefix,
   wherein the address selection request further comprises a plurality of parameters relating to characteristics of interfaces of the mobile node interacting with the access routers for which temporary addresses have been obtained.

4. A non-transient computer readable medium, comprising a set of instructions, which, when executed by a data-processing unit of a communication mobile node, instruct the communication mobile node to:
   obtain respective temporary addresses for several telecommunications system access routers detected by the mobile node;
   collect information relating to the characteristics of said access routers;
   transmit, to a temporary address management module of a mobility service provider, an address selection request comprising:
      at least a portion of said collected information, and
      a plurality of parameters relating to characteristics of interfaces of the mobile node interacting with the access routers for which temporary addresses have been obtained;
   receive a message indicating at least one address prefix identifying the selected temporary address; and
   configure the mobile node so that it communicates through the system by means of the access router corresponding to said prefix.

5. A temporary address management module for a mobility service provider in a telecommunications system, comprising:

means for receiving from a mobile node an address selection request comprising information collected by the mobile node relating to characteristics of respective access routers from which the mobile node has obtained temporary addresses;

means for processing the address selection request in order to select one of the temporary addresses for the mobile node; and means for signaling the selected temporary address comprising means for returning to the mobile node a message indicating at least the prefix of the selected temporary address, wherein the address selection request further comprises a plurality of parameters relating to characteristics of interfaces of the mobile node interacting with the access routers for which the temporary addresses have been obtained.

6. The temporary address management module as claimed in claim 5, wherein the returned message comprises an ordered list of address prefixes identifying the selected temporary address and at least one other of the temporary addresses obtained by the mobile node.

* * * * *